Figure 1:
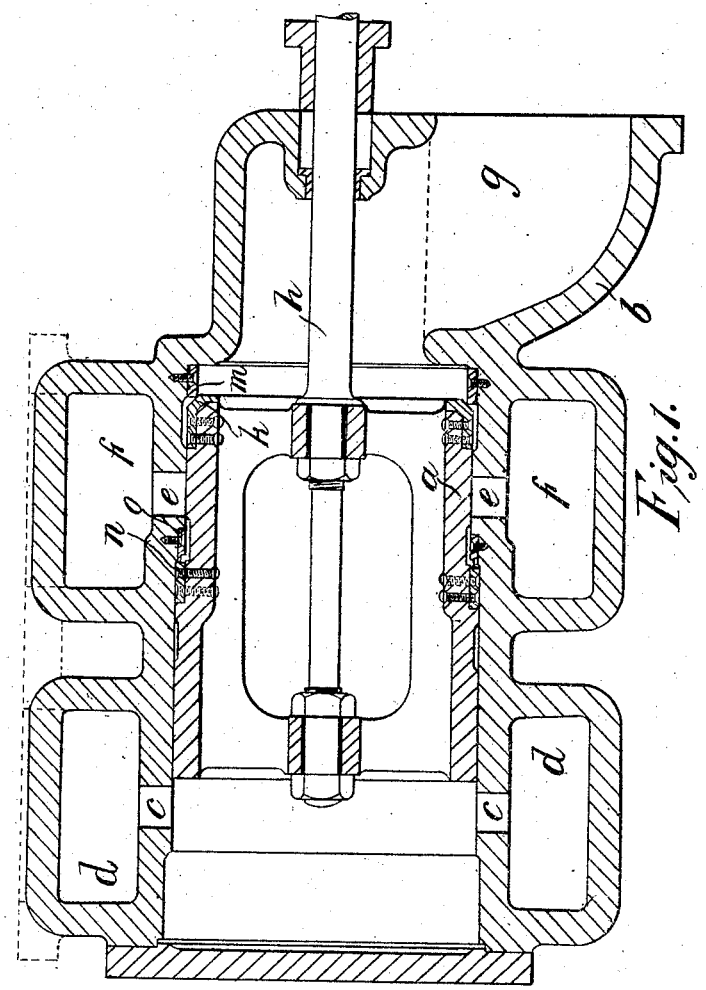

No. 851,205. PATENTED APR. 23, 1907.
C. A. PARSONS & J. TURNBULL.
MANEUVERING AND SIMILAR VALVE.
APPLICATION FILED JUNE 9, 1905.

2 SHEETS—SHEET 1.

Attest:
C. S. Middleton
L. B. Middleton

Inventors
Charles A. Parsons.
John Turnbull.
By Spear, Middleton, Donaldson & Spear
Attys No. 851,205. PATENTED APR. 23, 1907.
C. A. PARSONS & J. TURNBULL.
MANEUVERING AND SIMILAR VALVE.
APPLICATION FILED JUNE 9, 1905.
2 SHEETS—SHEET 2.
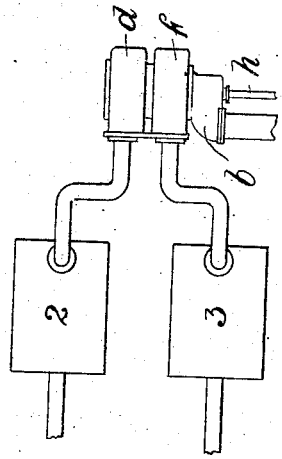
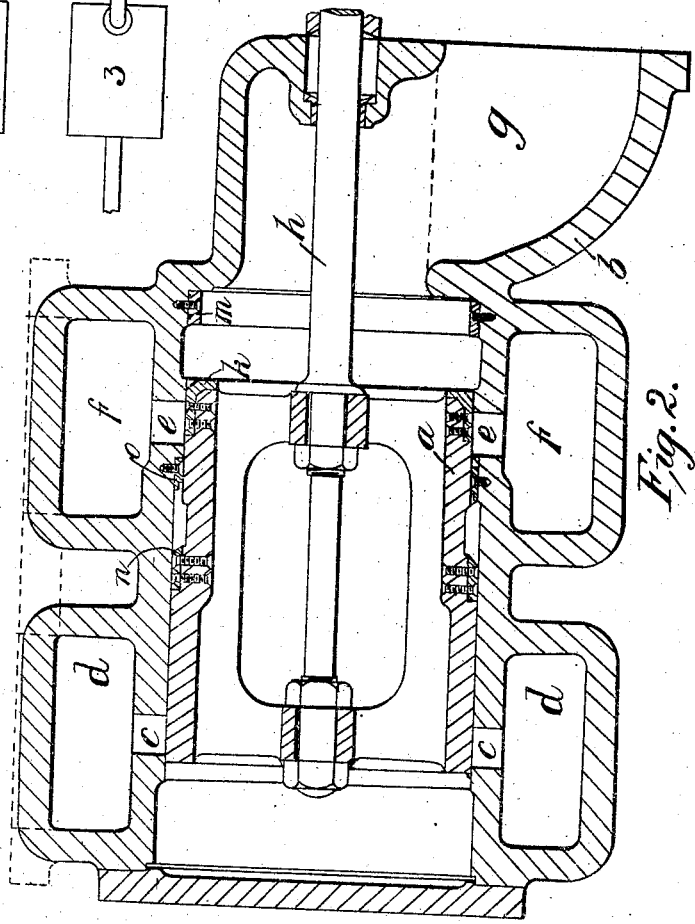

UNITED STATES PATENT OFFICE.

CHARLES ALGERNON PARSONS, OF NEWCASTLE-UPON-TYNE, AND JOHN TURNBULL, OF WALLSEND, ENGLAND; SAID TURNBULL ASSIGNOR TO SAID PARSONS.

MANEUVERING AND SIMILAR VALVES.

No. 851,205.     Specification of Letters Patent.     Patented April 23, 1907.

Application filed June 9, 1905. Serial No. 264,482.

*To all whom it may concern:*

Be it known that we, CHARLES ALGERNON PARSONS and JOHN TURNBULL, subjects of the King of Great Britain and Ireland, residing at Heaton Works, Newcastle-upon-Tyne, England, and Turbinia Works, Wallsend-on-Tyne, England, respectively, have invented new and useful Improvements in and Relating to Maneuvering and Similar Valves, of which the following is a specification.

This invention relates to improvements in piston valves for manœuvring and other purposes and is especially applicable to the piston valves used on board turbine propelled ships for admitting steam into the ahead or astern turbine as desired for the purpose of working ahead or astern. Such valves have heretofore been constructed either with an accurately machined mechanical fit or with loose rings or split rings to prevent leakage; such leakage is especially objectionable when working in conjunction with turbines, as when going ahead the leakage allows live steam to pass from the ahead turbine into the astern turbine thus causing considerable loss of power. It has been found, however, that with the fineness of fit necessary to prevent such leakage that there is a danger of the valve jamming and when rings are used the friction of the rings under steam pressure causes serious resistance to the motion of the valve.

The object of the present invention is to provide an improved construction of valve in which leakage is prevented without the necessity of packing rings or accurate fitting of the piston in its casing or cylinder.

Piston valves for manœuvring and like purposes usually consist of a cylindrical casing, with two rows of apertures near each end; inside this casing slides a cylindrical shell of such length that when it is pushed from one end to the other it alternately covers or closes the above mentioned ports thus if the center of the shell is in connection with the live steam it is obvious, according to the position of the sliding shell, that steam is admitted either into one or the other of the above mentioned ports and delivered to the ahead or the astern turbines, if used in conjunction with turbines.

The invention consists in providing a piston valve for manœuvring and like purposes with faces adapted in an extreme position of the valve to close against suitable faces formed in or fixed to the valve casing, whereby leakage of fluid is prevented when the valve is at its extreme position and the necessity of steam packing rings or accurate fitting of the piston in its casing is avoided.

Referring now to the accompanying drawings which form part of our specification, Figure 1 is a section through a valve constructed according to this invention, the valve being shown in its normal open or ahead position. Fig. 2 is a similar view with the manœuvring valve shown in its mid position. Fig. 3 is a view showing the application of a manœuvring valve according to this invention to forward and reversing turbines.

In carrying the invention into effect according to one form as illustrated in the accompanying drawing a piston valve $a$ is arranged to slide in a cylindrical casing $b$. This cylindrical casing is provided with two passages $d$ and $f$ communicating with the interior of the casing by means of ports $c$ and $e$, respectively. The casing $b$ is constructed of two internal diameters the step from the larger to the smaller diameter being placed between the ports $c$ and $e$. At this stepped part there is placed a valve seating, $o$, against which a shoe $n$ fixed to the piston valve is adapted to close when the valve $a$ is in its normal full open or ahead position. Thus if this form of valve is used in conjunction with steam turbines as shown diagrammatically in Fig. 3, the passage $d$ is connected to the forward running turbines 2 while the passage $f$ would be connected to the reversing turbine 3. At the front end of the piston valve $a$ there is provided another shoe $k$ adapted when the valve is in the position shown in Fig. 1 to close with a seating $m$ fixed to the valve casing $b$. The piston valve $a$ is actuated by means of a rod $h$ passing out of the casing $b$ through the gland $j$. Steam is led into the manœuvring valve by the passage $g$.

The invention will now be described as applied to a marine steam turbine installation where as will be readily understood the manœuvring valve will normally be open to the forward running turbine. As stated above the forward running turbine is connected to the passage $d$ while the reversing turbine is connected to the passage $f$. The position of the valve for forward running is illustrated in Fig. 1. Here it will be seen that the two conical valve faces $n$ and $k$ completely shut off the passage $f$, and consequently the reversing turbines, from any live steam which leaks past the loose fitting piston $a$ so that the vacuum in which the reversing turbine works shall not be affected. Further as in most cases the time during which the reversing turbine is working is very short no material amount of leakage of steam occurs when the valve $a$ is moved to the position in which steam is being supplied to that turbine. In some cases, however, we may provide a shoe and valve so as to positively prevent any leakage while the valve is in the full open position for astern running.

In some case the valve is made entirely of gun metal or the like and when this is so the conical valve faces may be formed on the sliding piston valve direct. With a cast iron casing however it is advisable to provide rings, $n$, $m$, $o$, $k$, so as to effectually prevent leakage of fluid even under varied conditions of pressure and temperature.

It will be recognized that our invention is applicable to other piston valves than those used for controlling the supply of steam to the forward and reversing turbines on board ship.

The manœuvring valve is generally fitted with a controlling valve between the inlet $g$ and the main steam pipe by which the supply of steam may be cut off from the manœuvring valve when required.

What we claim as our invention and desire to secure by Letters Patent is:—

1. A valve comprising a casing having a plurality of outlet branches, a cylindrical valve slidable in said casing and acting to close one or more of said outlets while the remainder is open, a fluid supply branch in said casing and communicating with the interior of said cylindrical valve, faces in said casing and abutting faces on said cylindrical valve acting to simultaneously stop the end movement of the valve.

2. A valve comprising a casing having two outlet branches and a supply branch, a cylindrical valve of two diameters slidable in said casing, valve faces, $n$ and $k$, fixed to said cylindrical valve, valve seats, $g$ and $m$, fixed to said casing, one on each side of an outlet branch, said valve seats and faces coacting to close the intervening outlet branch while the other is being supplied with steam from the supply branch through the cylindrical valve.

In testimony whereof we have signed our names to this specification in the presence of two subscribing witnesses.

CHARLES ALGERNON PARSONS.
JOHN TURNBULL.

Witnesses to the signature of the said Charles Algernon Parsons:
    HENRY GRAHAM DAKYNS, Jr.,
    WILLIAM DAGGETT.

Witnesses to the signature of the said John Turnbull:
    HENRY GRAHAM DAKYNS, Jr.,
    WILLIAM DAGGETT.